(12) United States Patent
Kennedy

(10) Patent No.: US 9,199,722 B2
(45) Date of Patent: Dec. 1, 2015

(54) ELECTRONIC FLIGHT CONTROLS WITH PARALLEL PROCESSED TORQUE AND POSITIONING FOR PILOT OR ASTRONAUT TOUCH FEEDBACK

(71) Applicant: Robert Dennis Kennedy, Honolulu, HI (US)

(72) Inventor: Robert Dennis Kennedy, Honolulu, HI (US)

(73) Assignee: Robert Dennis Kennedy, Honolulu, HI (US)

( * ) Notice: Subject to any disclaimer, the term of this patent is extended or adjusted under 35 U.S.C. 154(b) by 37 days.

(21) Appl. No.: 13/647,472

(22) Filed: Oct. 9, 2012

(65) Prior Publication Data

US 2014/0097300 A1 Apr. 10, 2014

(51) Int. Cl.
*B64C 13/00* (2006.01)
*B64C 13/12* (2006.01)
*B64C 13/46* (2006.01)
*B64C 13/04* (2006.01)

(52) U.S. Cl.
CPC ............. *B64C 13/12* (2013.01); *B64C 13/04* (2013.01); *B64C 13/46* (2013.01)

(58) Field of Classification Search
CPC .......... B64C 13/12; B64C 13/04; B64C 13/46
USPC .................................. 244/228, 229, 236, 237
See application file for complete search history.

(56) References Cited

U.S. PATENT DOCUMENTS

| | | | | |
|---|---|---|---|---|
| 6,704,001 | B1 * | 3/2004 | Schena et al. | 345/161 |
| 7,602,376 | B1 * | 10/2009 | Hetherington | 345/161 |
| 2012/0056039 | A1 * | 3/2012 | Stiefenhofer et al. | 244/229 |

\* cited by examiner

Primary Examiner — Timothy D Collins
Assistant Examiner — Michael Kreiner

(57) ABSTRACT

Cockpit controls designed for a at least two pilots and automation. Duplications of controls: sticks and control columns move along the same position path in unison with other sets of controls electronically based on a plurality of parallel processed parameters allowing two pilots to assist each other effectively with the ability of one pilot to override the other for effective monitoring and control in normal and emergency situations.

2 Claims, 5 Drawing Sheets

ELECTRONIC FLIGHT CONTROLS WITH PARALLEL PROCESSED TORQUE AND POSITIONING FOR PILOT OR ASTRONAUT TOUCH FEEDBACK

FIELD OF THE INVENTION

This invention relates to flight control systems and spaceflight control systems and the redundancy and sensor feedback given to the pilot or astronaut by stick motion, position and force felt in the finger tips and hand of the pilot or astronaut when an automated system is controlling the craft or another crew-member manipulates the controls or an independent system tries to shake the stick or move the stick to warn the pilot.

BACKGROUND OF THE INVENTION

Many so called "fly-by-wire" transport category prior-art dual control aircraft have controls that do not move in unison and do not transmit by feel the manipulation of the controls by one pilot to the other pilot or control surface aerodynamic deflection force or the auto-pilot or automation moving the controls or control surfaces, or warning systems that transmit warnings through feel in the stick or control column. In the case of two pilots with their hands on the controls at the same time the pilot applying the greater force does not override the other pilot. Button presses or procedural steps including call outs are necessary to transfer control or to override the other stick defeating an important redundancy that previously existed on even the earliest aircraft. Additionally when an auto-thrust system is changing settings many transport category aircraft have thrust levers that are not moved by automation so the additional instant redundant feedback for engine control settings by feel has been lost and only can be seen by latent instrument movement of thrust settings in the pilots visual frame of reference.

A large number of prior art transport category aircraft flying today force the pilot to use his sense of vision much more to make up for loss of touch feedback. Whoever is at the controls can only convey what is being done with the stick to the other pilot visually and/or aurally and not by feel in the other pilots controls (other pilots fingers and hands). Methods of warning the pilot of imminent danger through feel exist on many aircraft flying today except for a large number of so called "fly by wire" transport category aircraft. The prior art stick shaker and stick pusher methods of warning the pilot through feel of a problem have been discarded. Therefore the aircraft can be said to be less automated in this respect causing added work for the pilots especially in emergency situations and especially to find out what automation may be doing. In many emergent situations such as cockpit display failure, smoke in the cockpit, or unreliable sensor/instrument indications the pilot who would normally not have to speak about control position must talk to the other pilot creating extra chatter. In the case of automated flight neither control stick moves at all nor do the thrust levers on many transport category aircraft flying today.

Resultant instrument readings that must be used in place of the sense of touch is not trivial in providing instant sensory information used by the pilot to have awareness of the status of the aircraft and control positions. Earliest aircraft had cables to transmit control movement by one pilot to the other pilot via movements in both sticks or control columns and aerodynamic forces were also transmitted to the sticks or yoke and control column giving instant awareness of the status of the aircraft and control positions. Additionally the thrust levers, rudder pedals and in the case of turbo-props power levers, and propeller levers used cables or other mechanical mechanisms to indicate commanded values by their position. Feedback to the pilot what commanded values were set could easily be felt by the position of the levers. Auto-thrust systems moved the thrust-levers and in the case of the autopilot the yoke and control columns were moved indicating by feel what the current commanded position or setting was.

More widespread use of compact multiprocessor devices and their increased availability has made the application of multiprocessing to many applications much less expensive and compact and facilitates real time parallel computation of vector dot products to apply motion and torque to computer controlled electromagnets to directly drive the motion and maintain the position of a shaft on the end of a gimbal.

In view of these disadvantages and advantages this invention addresses this lack of redundancy in many modern transport category aircraft in flight today and to carry forward the redundant safety feature built into some of the earliest aircraft flown with the earliest art cable linked control systems which allowed feedback to the pilot through feel to indicate control movements by the other pilot, aerodynamic forces or the computer/automated flight control system actions via a robust and cost effecting parallel computing electronic means.

SUMMARY OF THE INVENTION

A stick with a universal joint mounted on its base to maintain a planar sheet parallel to the floor but able to move freely translating the motion input at the top of the stick. Up the shaft a gimbal is mounted at a fixed location which allows the motion to translate to the lower planar sheet of ferrous or magnetic or variably magnetized planar material housed below and clear of the pilot's hand wherein the plane moves in close proximity to permanent neodimium magnets which keep the stick from falling over when power is removed from electromagnets which apply magnetic attractive force to the ferrous plane to provide variable feel and control surface feedback feel to the pilot electronically.

The stick assembly and friction feel plate described above is combined with a parallel real time computer controlled system that moves the stick to a precise position electronically with a specific torque, speed, acceleration or deceleration and trajectory by means of groups of windings to produce a focus of magnetism to move the shaft. Lengthwise sections of windings are generally perpendicular to the shaft to allow tilt movement rather than rotational movement. As the autopilot flies the aircraft or a pilot flies the aircraft the other pilot is given feel that indicates what the autopilot or other pilot is doing rather than only seeing it collaterally by instrument changes. Aerodynamic control force is also added to the stick feel.

BRIEF DESCRIPTION OF THE DRAWINGS

The foregoing and other objects and advantages of the invention will become more clear with reference of the following detailed description as illustrated by the drawings in which.

DETAILED DESCRIPTION

FIGS. 1 through 5 detail a simple parallel computing environment with accompanying mechanical assembly and parallel computerized electronic control according to this invention. Nevertheless, this description should be considered to apply to any type of lever or stick or control column and yoke. Other generalized adaptations include electronic gimbal applications wherein precise positioning with strong position holding and redundant position encoding and control over torque and acceleration and velocity of shaft or other movement is required.

Figure 1:
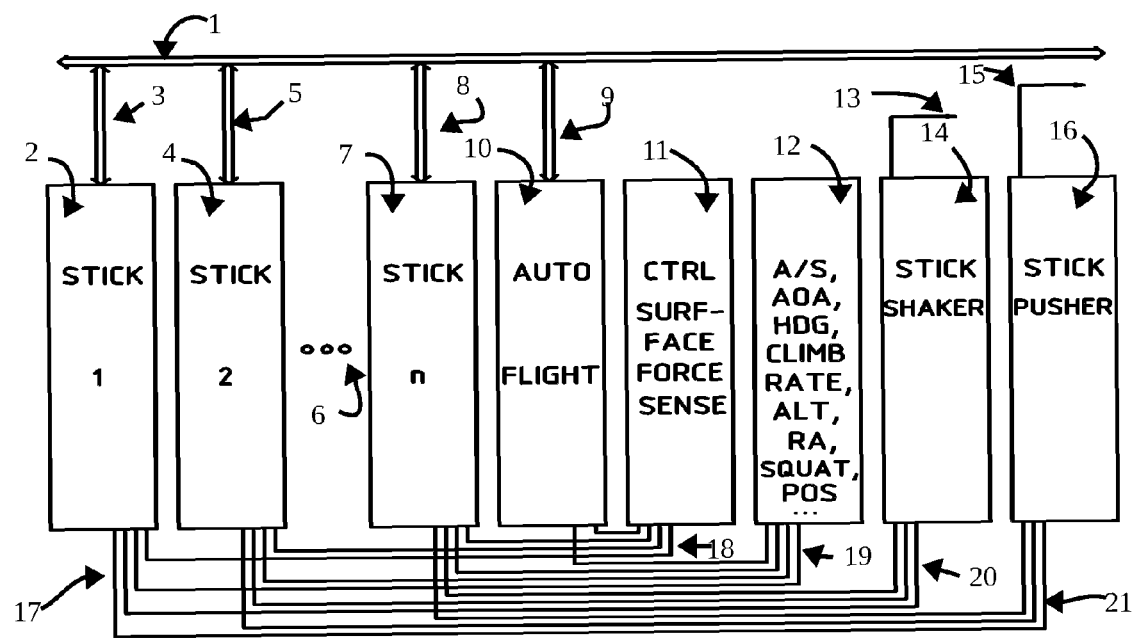
FIG. 1 is a schematic diagram of a parallel stick control computing system showing the combined stick controller and other elements according to this invention

FIG. 1 details the schematic diagram of the parallel computing embodied by this invention to control all stick parameters and movement within 1 ms or less with a goal of less than 700 ns wherein each stick has essentially a black box 2, 4, and 7 or however many are in the system 6. Each black box has its own processing units and takes as input: sensor information 11 from the control surfaces 18, the automated flight control system or auto-pilot 10 via bus 9, other stick output 3, 5 and 8 via a bus or other broadcast method 1 which includes: torque, acceleration, deceleration, velocity, friction or holding force, the stick shaker, and the stick pusher. All flight parameters: pitot static airspeed, computed GPS based ground speed, barometric altitude, GPS altitude, vertical speed, magnetic heading, GPS ground track, temperature, altitude 12 are fed to each black box by discrete channels 19, ball left, ball right . . . . All of these signals are independently redundant with at least three other independent sensors and three independent and unique signal paths 17 and wherever possible independently written algorithms and sense methods are used in each redundant system. A voting method is used to flag and throw out any possibly failing sensor or sensor signal path. A stick shaker is used to warn the pilot through feel of a near stall condition. A stick pusher is used to warn the pilot through feel by pushing the stick forward when an imminent stall is sensed. A stick shaker 14 has independent sensor input 13 and the stick pusher 16 has independent input 15 as well. The stick shaker and stick pusher are independent systems which feed directly 20 and 21 into the stick black boxes 2, 4, and 7 or however many are in the system 6.

Figure 2:
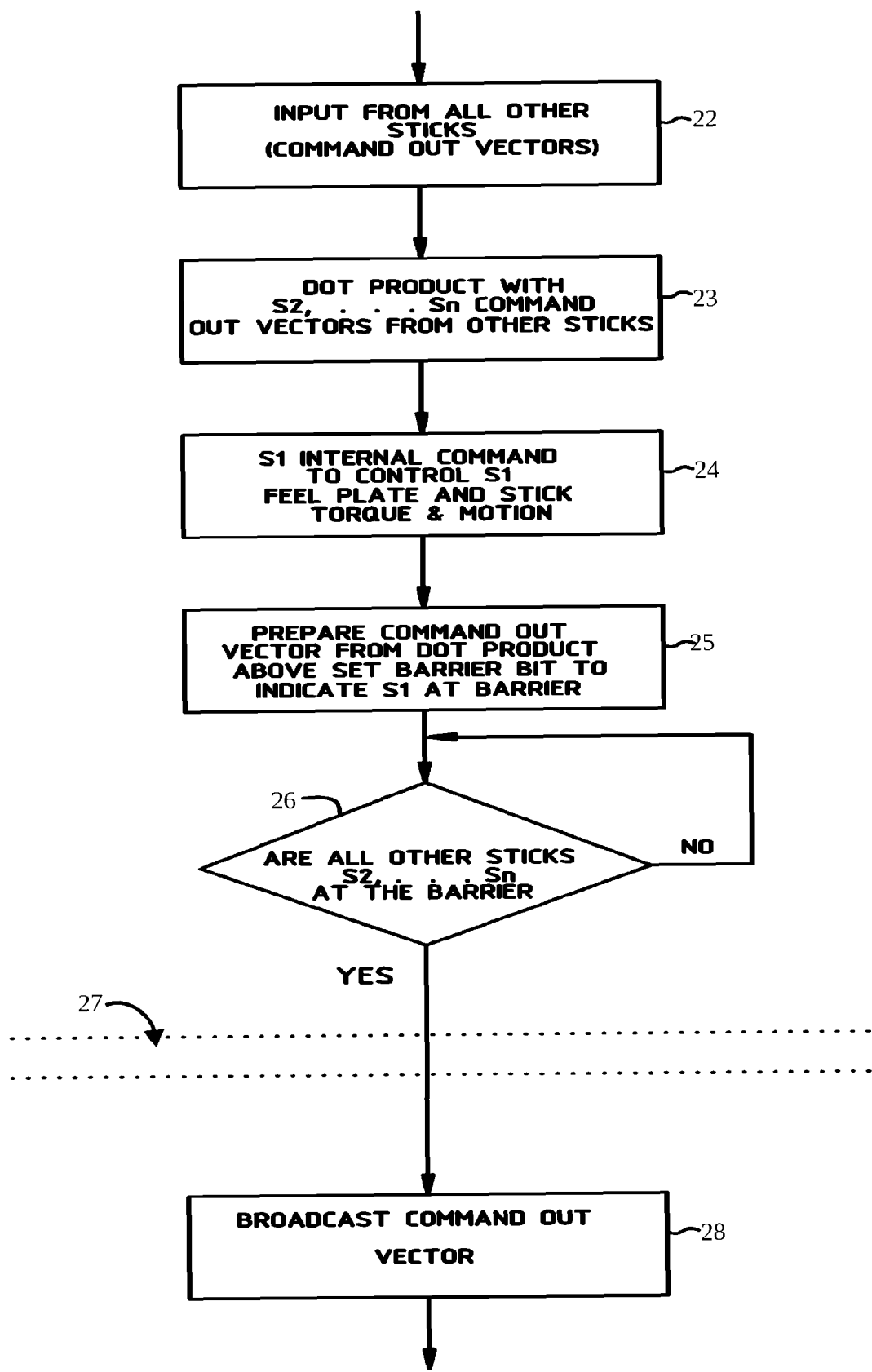
FIG. 2 is a flow diagram of the procedure for each stick control processor

FIG. 2 details the flow diagram of a parallel processed procedure for each stick control processor. Each black box acquires all of the parameters (described by their respective command out vector) 22 and performs a dot product 23 of the individual stick command direction and force to produce an internal command for its own stick 24 which it rapidly executes. A new command out vector for the individual stick is prepared 25. This point in time is a synchronization point wherein all stick black boxes 26 wait at a barrier until all others have reached a point wherein all individual stick black boxes are ready to issue a stick command. This is the synchronization barrier 27. This command contains the appropriate force on the friction/feel sheet while producing the appropriate torque and trajectory with corresponding activations of the electromagnetic windings on the stick and the windings or electromagnets surrounding the stick. Once all of the sticks have reached this barrier all black boxes are said to be in synchronization and broadcast their respective command out vectors 28. All of this happens in less than 1 ms. A provision is made wherein all sticks can revert to a constant friction force and an open loop dead joystick (which is much like what is used in normal operation of current "fly by wire" transport category aircraft today) configuration wherein stick torque and positioning electromagnetics are turned off and simple position encoding is used.

Figure 3:
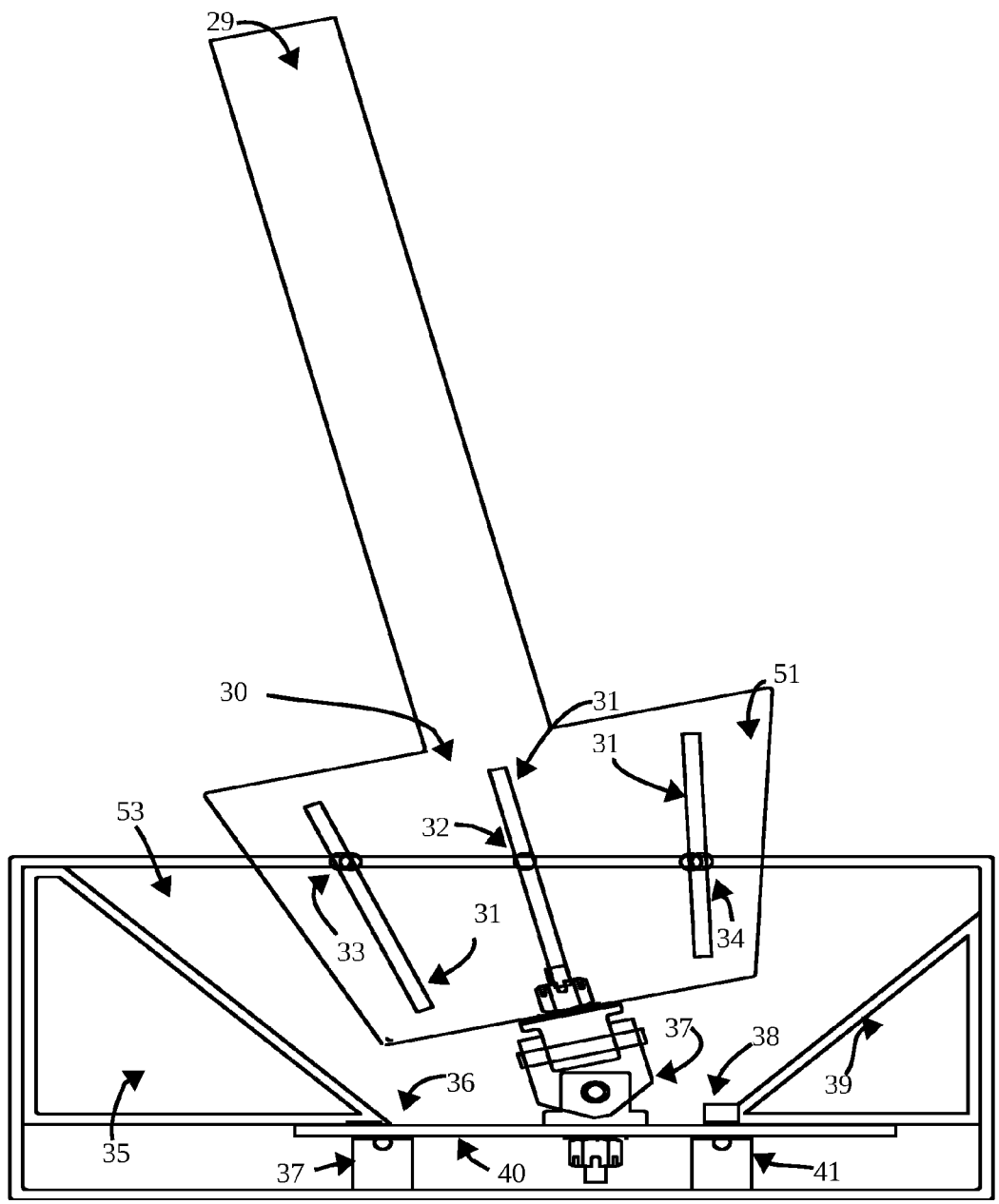
FIG. 3 is a cutaway of the elementary electrical and mechanical parts according to this invention

FIG. 3 is a cutaway detail of the stick body 29 and enclosure assembly according to this invention wherein neodimium magnets 36 maintain a permanent friction on the stick to prevent it from flopping over when power is removed from the electromagnetics which control the stick movements. A set of electromagnets 38 maintain a holding force on the stick via the feel plate 40 which is variable by control. The feel plate is suspended by ball bearings 37 and 41 and is moved by the universal joint 37 attached to the bottom of the stick. Electromagnetic movement is achieved by a plurality of windings which are activated by computer and are separated by an air gap 53 and reside at the surface of a bowl like structure 35 and 39 and the outer portion 51 of the bell like structure at the base of the stick 30.

This inverted bell like structure has three slots 31 wherein bearings 33, 32, and 34 remain in a fixed position but allow the shaft or stick 29 to tilt and move the feel plate 40 while remaining secure. Position information can be decoded from the relative position of the bearings 32, 33, and 34 relative to the bell like structure at the base of the stick 30. Redundant position information can also be decoded from the position of the feel plate 40 X and Y position. A backup positioning system can be in the form of X,Y movement of the feel plane via rack and pinions.

Figure 4:
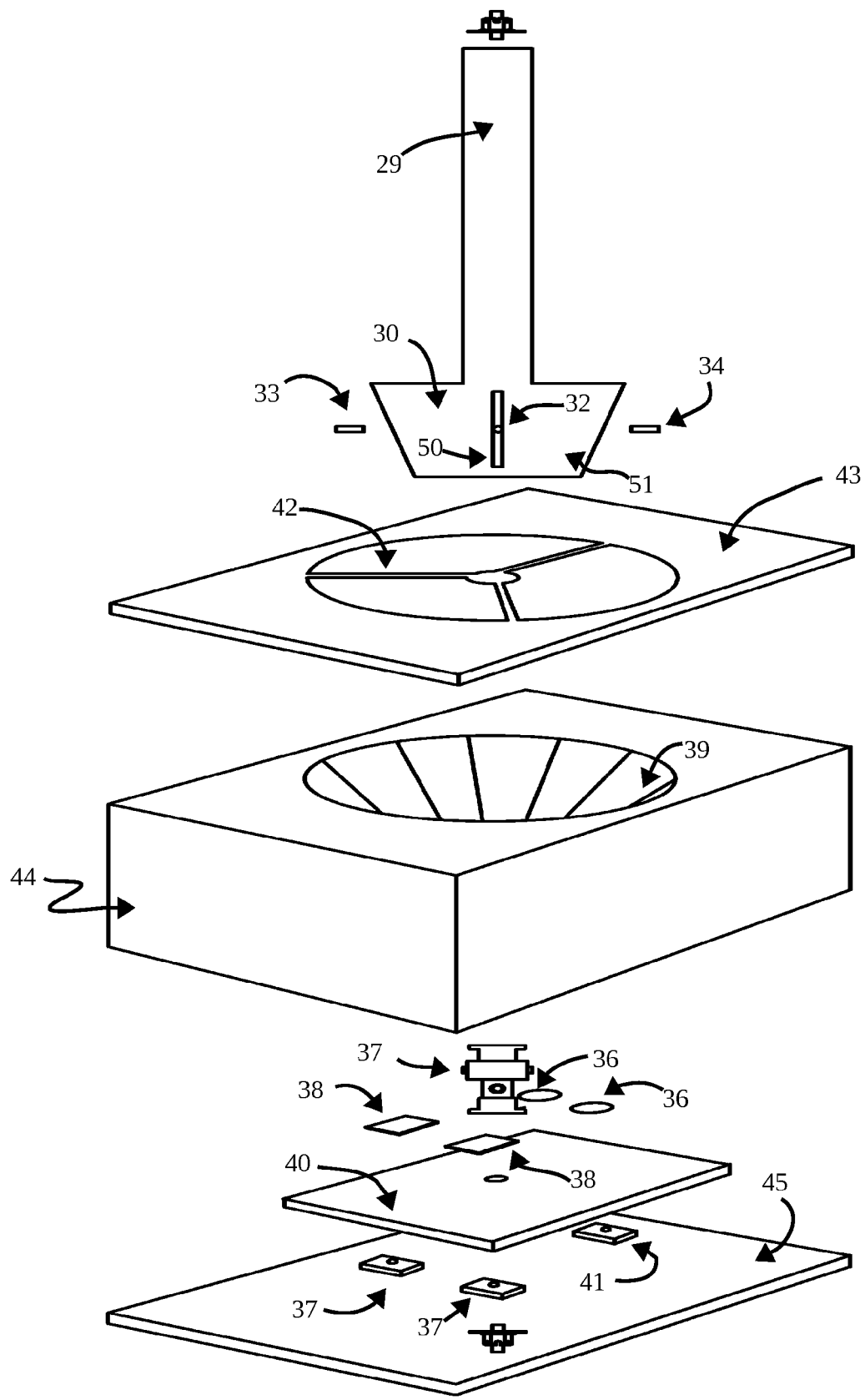
FIG. 4 is an exploded partial perspective view of FIG. 3 showing the elementary electrical and mechanical parts according to this invention

FIG. 4 details an exploded partial perspective view of the stick body and enclosure 44 assembly according to this invention. The stick 29 is comprised of an inverted bell like shaped structure 30 on the end of a shaft. The inverted bell like structure 30 contains pluralities of electromagnets positioned around the surface 51 of the inverted bell wherein computer controlled electronics can selectively activate individual electromagnets located in the bell 51 as well as any of the pluralities of electromagnets in the bowl 39. Three slots 50 on the bell allow the stick to tilt in any direction by means of bearings 32, 33, and 34 mounted on the retaining plate 43 spokes 42. A universal joint 37 mounted on the base of the bell moves a heavy steel feel plate 40 which is secured by bearings 37 and 41 mounted on the base plate 45 underneath. Neodimium magnets 36 and electromagnets 38 act as bushings securing the plate from above and supplying holding forces to the stick.

Figure 5:
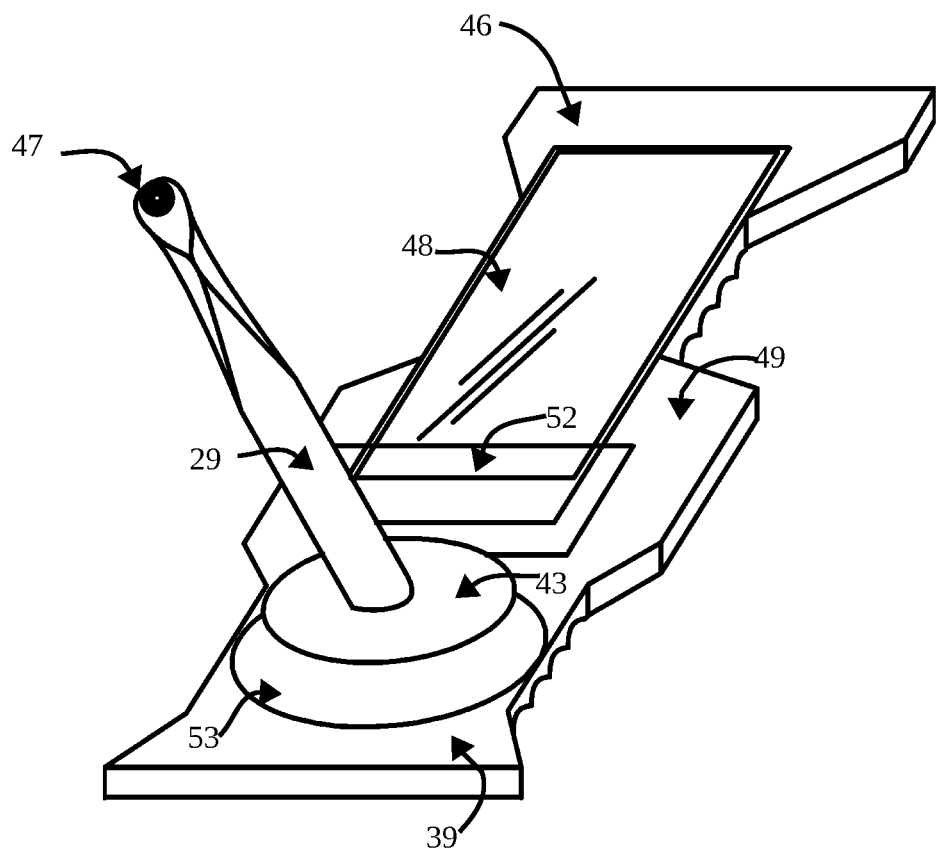
FIG. 5 is a perspective view of a stick controller combined with a mobile phone or tablet case with the electrical and mechanical parts according to this invention.

FIG. 5 details a perspective view of a stick 29 mounted in a mobile phone or tablet 48 case 46. The bowl assembly is mounted in the case 39 with an air gap 53 separating the electromagnets mounted in the stick base held in place by the retaining plate 43. Control electronics and batteries are housed in the case 49 wherein communication to the tablet or mobile phone is achieved by a touch screen I/O adapter 52 to and from the stick controller. The normal operating mode of the system is not "control wheel steering". A trim system button is present on the stick 47. With a press of this button 47 the stabilizer is quickly electronically trimmed most efficiently with aircraft equipped with canards or flying tails/stabilators. Extra time may be required for aircraft with less efficient elevator designs. Depending on the overall aircraft design the trim button 47 may be used to fully trim the aircraft in all axes.

What is claimed is:

1. An aircraft control stick for manually controlling operation of an aircraft, the control stick comprising:
   a stick body comprising a base and a shaft, wherein the base is positioned below the shaft;

a support structure for the stick body comprising a retaining plate, an enclosure, and a base plate, wherein the retaining plate is attached to the upper surface of the enclosure and the base plate is attached to the lower surface of the enclosure;

the retaining plate comprising an aperture therethrough for accommodating the base of the stick body, the retaining plate further comprising at least three spokes extending radially inward from a perimeter of the aperture and attached to a spoke hub at the center of the aperture;

wherein the base of the stick body has a slot therethrough for each of the at least three spokes, each slot having a bearing movably supported within the slot and connected to a spoke, such that the base of the stick body is retained by the spokes, with the spoke hub being contained within the volume of the base of the stick body;

the control stick further comprising a universal joint having an upper end and a lower end, the upper end of the universal joint being attached to the base of the stick body, and the lower end of the universal joint being attached to a feel plate;

wherein the feel plate is contained within the enclosure and is supported on the base plate such that the feel plate is constrained from movement in a direction orthogonal to a horizontal plane defined by the feel plate.

2. The aircraft control stick of claim 1, further comprising a rack and pinion configured to translate the feel plate in coordinated motion along an X-axis and Y-axis.

* * * * *

UNITED STATES PATENT AND TRADEMARK OFFICE
CERTIFICATE OF CORRECTION

PATENT NO. : 9,199,722 B2
APPLICATION NO. : 13/647472
DATED : December 1, 2015
INVENTOR(S) : Kennedy It is certified that error appears in the above-identified patent and that said Letters Patent is hereby corrected as shown below:

Columns 4-5, lines 64-25, should read 1. (Currently Amended) A shaft that is moved with a computer controlled torque, acceleration, velocity and trajectory to a precise position or in synchronization or unison with another stick or sticks wherein the base of the shaft is attached to a moveable planar sheet with a universal joint wherein the shaft passes through a gimbal that is mounted part way up the shaft but allows tilting movement of the shaft through its inverted cone throw limits to be translated to movement of the plate or sheet attached to the base with the universal joint wherein the plate or sheet remains parallel to the floor wherein transmitted stick movement (acceleration and velocity) and transmitted stick torque are achieved by pluralities of insulated conductor windings placed near the stick divided into sections which when energized by computer control activate a specific electromagnet or combinations of electromagnets wherein combinations or sequencing of electromagnetic activations achieve various torque, acceleration and velocities on the stick by means of attractive and or repulsive forces wherein the stick can be precisely positioned wherein a parallel computing environment allows all sticks in the system to transmit their computed and sensed torque, position, acceleration, and velocity very rapidly with a guaranteed response time to all other sticks in the system <u>wherein each stick acquires parameters (described by their respective command out vector) and performs a dot product of the individual stick command direction and force to produce an internal command for is own stick which it rapidly executes wherein a new command out vector for the individual stick is prepared wherein this point in time is a synchronization point wherein all stick control processors wait at a barrier until all others have reached a point wherein all individual stick control processors are ready to issue a stick command.</u>

Signed and Sealed this
Ninth Day of February, 2016

Michelle K. Lee
*Director of the United States Patent and Trademark Office*

CERTIFICATE OF CORRECTION (continued)
U.S. Pat. No. 9,199,722 B2

Column 5, lines 26-28, should read 2. (Original) The shaft that is moved with a computer controlled torque, acceleration, velocity and trajectory to a precise position or in synchronization or unison with another stick or sticks in claim 1 wherein transmitted stick movement (acceleration and velocity) and transmitted slick torque are achieved by movement of the planar sheet described in claim 1 to a plurality of X,Y positions which in turn move the stick to a plurality of positions wherein this movement is achieved by rack and pinions driven by servo, stepper, or computer controlled commutated direct drive motors.